US008810897B2

(12) United States Patent
Hashimura et al.

(10) Patent No.: US 8,810,897 B2
(45) Date of Patent: Aug. 19, 2014

(54) METHOD FOR IMPROVING METALLIC NANOSTRUCTURE STABILITY

(75) Inventors: Akinori Hashimura, Vancouver, WA (US); Liang Tang, West Sacramento, CA (US); David R. Evans, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 127 days.

(21) Appl. No.: 13/434,548

(22) Filed: Mar. 29, 2012

(65) Prior Publication Data

US 2013/0077036 A1    Mar. 28, 2013

Related U.S. Application Data

(63) Continuation-in-part of application No. 12/836,121, filed on Jul. 14, 2010, now Pat. No. 8,368,998, which is a continuation-in-part of application No. 12/646,585, filed on Dec. 23, 2009, now Pat. No. 8,223,425, which is a continuation-in-part of application No. 12/635,349, filed on Dec. 10, 2009, now Pat. No. 8,355,099, which is a continuation-in-part of application No. 12/621,567, filed on Nov. 19, 2009, now Pat. No. 8,339,543, which is a continuation-in-part of application No. 12/614,368, filed on Nov. 6, 2009, now Pat. No. 8,045,107.

(51) Int. Cl.
*G02B 26/00* (2006.01)
*G02F 1/167* (2006.01)

(52) U.S. Cl.
CPC ...................................... *G02F 1/167* (2013.01)
USPC ........................................... 359/296; 349/166

(58) Field of Classification Search
USPC ......... 359/228, 245, 277, 290–296, 322, 452, 359/585–586; 349/117, 166, 106; 385/1, 385/901, 122
See application file for complete search history.

(56) References Cited

U.S. PATENT DOCUMENTS

| 2007/0026686 | A1* | 2/2007 | Chou et al. ..................... 438/760 |
| 2007/0202673 | A1* | 8/2007 | Kim et al. ...................... 438/580 |
| 2010/0046902 | A1* | 2/2010 | Kaplan et al. ................. 385/129 |

FOREIGN PATENT DOCUMENTS

| JP | 2000-098323 | 4/2000 |
| JP | 2010-185970 | 8/2010 |

OTHER PUBLICATIONS

McMahon M et al., Rapid Tarnishing of Silver nanoparticles in ambient laboratory air, Appl Phys B Lasers Opt 2005;80:915-21.

* cited by examiner

*Primary Examiner* — Thomas K Pham
*Assistant Examiner* — Vipin Patel
(74) *Attorney, Agent, or Firm* — Law Office of Gerald Maliszewski; Gerald Maliszewski

(57) ABSTRACT

A method is provided for improving metallic nanostructure stability. The method provides a substrate, and using a physical vapor deposition (PVD) process for example, deposits metallic nanostructures having a first diameter overlying the substrate. Some examples of metallic nanostructures include Ag, Au, and Al. The metallic nanostructures are annealed in an atmosphere including an inert gas and $H_2$. The annealing temperature is less than the melting temperature the metal material in bulk form. In response to the annealing, stabilized metallic nanostructures are formed. If the stabilized metallic nanostructures are exposed to an ambient air environment the stabilized metallic nanostructure maintain the first diameter. Typically, the metallic nanostructures are initially formed having a rectangular shape with corners. After annealing, the stabilized metallic nanostructures have a dome shape.

18 Claims, 6 Drawing Sheets

METHOD FOR IMPROVING METALLIC NANOSTRUCTURE STABILITY

RELATED APPLICATION

The application is a Continuation-in-Part of an application entitled, PLASMONIC ELECTRONIC SKIN, invented by Tang et al., Ser. No. 12/836,121, filed on Jul. 14, 2010, and issued as U.S. Pat. No. 8,368,998;

which is a Continuation-in-Part of an application entitled, PLASMONIC DEVICE TUNED USING PHYSICAL MODULATION, invented by Tang et al., Ser. No. 12/646,585, filed on Dec. 23, 2009, and issued as U.S. Pat. No. 8,223,425;

which is a Continuation-in-Part of an application entitled, PLASMONIC DEVICE TUNED USING LIQUID CRYSTAL MOLECULE DIPOLE CONTROL, invented by Tang et al., Ser. No. 12/635,349, filed on Dec. 10, 2009, and issued as U.S. Pat. No. 8,355,099;

which is a Continuation-in-Part of an application entitled, PLASMONIC DEVICE TUNED USING ELASTIC AND REFRACTIVE MODULATION MECHANISMS, invented by Tang et al., Ser. No. 12/621,567, filed on Nov. 19, 2009, and issued as U.S. Pat. No. 8,339,543;

which is a Continuation-in-Part of an application entitled, COLOR-TUNABLE PLASMONIC DEVICE WITH A PARTIALLY MODULATED REFRACTIVE INDEX, invented by Tang et al., Ser. No. 12/614,368, filed on Nov. 6, 2009, and issued as U.S. Pat. No. 8,045,107. All the above-referenced applications are incorporated, herein by reference,

BACKGROUND OF THE INVENTION

1. Field of the Invention

This invention generally relates to plasmonic displays and, more particularly, to a method for improving the stability of metallic nanostructures used in the fabrication of plasmonic displays.

2. Description of the Related Art

Reflective display or color-tunable device technology is attractive primarily because it consumes substantially less power than liquid crystal displays (LCDs) and organic light emitting diode (OLED) displays. A typical LCD used in a laptop or cellular phone requires internal (backlight) illumination to render a color image. In most operating conditions the internal illumination that is required by these displays is in constant competition with the ambient light of the surrounding environment (e.g., sunlight or indoor overhead lighting). Thus, the available light energy provided by these surroundings is wasted, and in fact, the operation of these displays requires additional power to overcome this ambient light. In contrast, reflective display technology makes good use of the ambient light and consumes substantially less power.

A number of different reflective display technologies have been developed, such as electrophoretic, electrowetting, electrochromic displays, and interference-based MEMS display. These display technologies all have disadvantages or challenges that must be overcome to obtain greater commercial success. Many existing technologies rely upon phenomena that are intrinsically slow. For example, electrophoretic or electrochemical techniques typically require particles to drift or diffuse through liquids over distances that create a slow response. Some other technologies require high power to operate at video rates. For example, many reflective displays must switch a large volume of material or chromphores from one state to another to produce an adequate change in the optical properties of a pixel. At video switching rates, currents on the order of hundreds of $mA/cm^2$ are necessary if a unit charge must be delivered to each dye molecule to affect the change. Therefore, display techniques that rely on reactions to switch dye molecules demand unacceptably high currents for displaying video. The same holds true for electrochromic displays.

A second challenge for reflective displays is the achievement of high quality color. In particular, most reflective display technologies can only produce binary color (color/black) from one material set. Because of this, at least three sub-pixels using different material sets must be used when employing a side-by-side sub-pixel architecture with fixed colors. This limits the maximum reflected light for some colors to about ⅓, so that the pixels of this type cannot produce saturated colors with a good contrast.

Finally, some reflective displays face reliability problem over a long lifetime. In particular, to sustain video rate operation for a few years requires at least billions of reversible changes in optical properties. Achieving the desired number of cycles is particularly difficult in reflective displays using techniques based on chemical reactions, techniques that involve mixing and separation of particles, or MEMS technology that involves repeated mechanic wear or electric stress.

In polymer-networked liquid crystal (PNLC) or polymer dispersed liquid crystal (PDLC) devices, liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. The curing conditions affect the size of the droplets that in turn affect the final operating properties of the "smart window". Typically, the liquid mix of polymer and liquid crystals is placed between two layers of glass or plastic that includes a thin layer of a transparent, conductive material followed by curing of the polymer, thereby forming the basic sandwich structure of the smart window. This structure is in effect a capacitor.

Electrodes from a power supply are attached to the transparent electrodes. With no applied voltage, the liquid crystals are randomly arranged in the droplets, resulting in scattering of light as it passes through the smart window assembly. This scattering results in a translucent "milky white" appearance. When a voltage is applied to the electrodes, the electric field formed between the two transparent electrodes on the glass causes the liquid crystals to align, allowing light to pass through the droplets with very little scattering and resulting in a transparent state. The degree of transparency can be controlled by the applied voltage. This is possible because at lower voltages, only a few of the liquid crystals align completely in the electric field, so only a small portion of the light passes through while most of the light is scattered. As the voltage is increased, fewer liquid crystals remain out of alignment, resulting in less light being scattered. It is also possible to control the amount of light and heat passing through, when tints and special inner layers are used. It is also possible to create fire-rated and anti X-Ray versions for use in special applications. Most of the devices offered today operate in on or off states only, even though the technology to provide for variable levels of transparency is available. This technology has been used in interior and exterior settings for privacy control (for example conference rooms, intensive-care areas, bathroom/shower doors) and as a temporary projection screen.

The full range of colors produced by plasmon resonances resulting from metal nanostructures has been known since ancient times as a means of producing stained colored glass.

For instance, the addition of gold nanoparticles to otherwise transparent glass produces a deep red color. The creation of a particular color is possible because the plasmon resonant frequency is generally dependent upon the size, shape, material composition of the metal nanostructure, as well as the dielectric properties of the surroundings environment. Thus, the optical absorption and scattering spectra (and therefore the color) of a metal nanostructure can be varied by altering any one or more of these characteristics. The parent applications listed above describe means of electronically controlling these color-producing characteristics.

The properties of metallic nanoparticles have drawn significant attention due to their application in photonics and electro-optics, as well as their potential application in biological/chemical sensors and renewable energy. Moreover, the fabrication of periodic metal nanoparticle arrays for applications in photonics utilizing their localized surface plasmon resonance (LSPR) properties has been extensively studied in recent years. Among various processing techniques, depositing a film of metal on a nano-size patterned mask and using a lift-off process to remove the sacrificial layer is becoming a widely used technique, because it allows for fabricating nanoparticles with precisely controlled shape, size, and particle spacing. In the past, there have been various reports on the fabrication and optical properties of Ag nanoparticles. However, very little research has focused on the stability of metal-deposited Ag nanoparticles, which in turn determines the long term durability of devices and potential success in commercial applications.

One known issue is the chemical degradation due to silver sulfidation in ambient conditions. Early studies revealed that a hydrogen sulfide ($H_2S$) may act as a reactive agent for silver sulfidation. Later studies reported that carbonyl sulfide (OCS), commonly found in the atmosphere, can also readily sulfidize silver. Some work has investigated the mechanism of silver sulfidation for both species, as enhanced by a higher relative humidity in the environment. Recently, the effect of chemical degradation on plasmon resonance peak has been studied, and one group has reported significant wavelength shift on Ag-deposited array nanoparticles due to the formation of silver sulfide ($Ag_5S$) at the surface level. Therefore, a manufacturing method with the goal of reducing the corrosion of metal nanostructures, and improving reliability and durability, is of high importance for the further penetration of nanotechnology into commercial applications.

It would be advantageous if there was a method for the prevention of metal sulfides and metal oxides on metallic nanoparticles, to improve their reliability as conductors and plasmons.

SUMMARY OF THE INVENTION

Disclosed herein is a method of thermally treating metallic nanostructures to reduce the chemical degradation of metal oxidation and sulfidation in atmospheric conditions. When a metallic nanostructure film is deposited using a physical vapor deposition (PVD) method, the material deposited usually has a very irregular atomic layer arrangement with high Gibbs free surface energy. In this state, the atomic molecules are generally in an unstable state of equilibrium with crystalline defects existing within the deposited material. Moreover, due to the nature of nanostructures having very large surface-to-volume ratio compared to its bulk material properties, the higher process-initiated free energy effects are intensified, resulting in much larger defects and dislocation of metal atoms. Higher free energy is also associated with higher internal stress of the material, resulting in mechanical fractures of the material. In addition, higher free energy is associated with an increase in chemical reactivity thus promoting sulfidization and corrosion in general. By thermally annealing the nanostructures in controlled atmosphere, the diffusion of atoms within a solid metal occurs and thus the material progress towards its natural equilibrium state.

Accordingly, a method is provided for improving metallic nanostructure stability. The method provides a substrate, and using a PVD process for example, forms metallic nanostructures having a first diameter overlying the substrate. Some examples of metallic nanostructures include Ag, Au, and Al. The metallic nanostructures are annealed in an atmosphere including an inert gas and $H_2$. The annealing temperature is less than a melting temperature of the bulk material forming the metallic nanostructures. In response to the annealing, stabilized metallic nanostructures are formed. If the stabilized metallic nanostructures are exposed to an ambient air environment, the stabilized metallic nanostructure maintain the first diameter. Typically, the metallic nanostructures have a rectangular shape with corners. After annealing, the stabilized metallic nanostructures have a dome shape.

Additional details of the above-described method, a method for forming a plasmonic display with improved metallic nanostructure stability, and an associated plasmonic display device are presented below.

DETAILED DESCRIPTION

Figure 1:
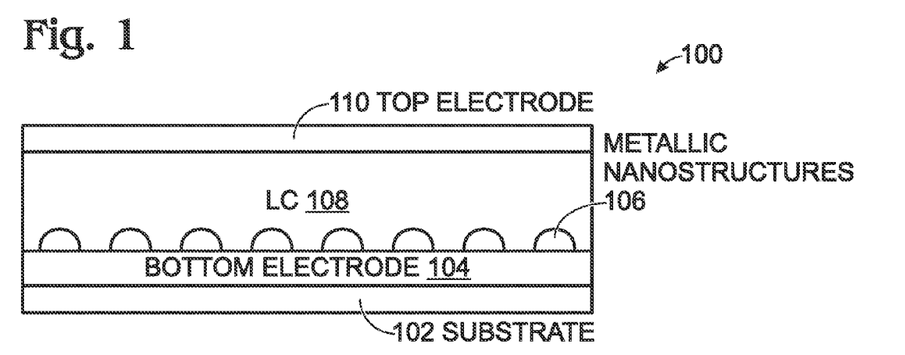
FIG. 1 is a partial cross-sectional view of a plasmonic display with stable metallic nanostructures.

FIG. 1 is a partial cross-sectional view of a plasmonic display with stable metallic nanostructures. The display 100 comprises a glass substrate 102. A transparent bottom electrode 104, such as an indium tin oxide (ITO) material overlies the glass substrate 102. Other transparent conductive materials are well-known. In some aspects not shown, a basecoat may be interposed between the substrate and bottom electrode. Annealed metallic nanostructures 106 overlie the transparent bottom electrode 104. As explained in more detail below, the metallic nanostructures 106 generally have a dome shape. As noted in parent application Ser. No. 12/635,349, some of the benefits of dome-shaped nanoparticles are a larger wavelength tuning range, by maximizing the effective refractive tuning range. Further, there is little angle dependence in the reflected color due to isotropic electric field distribution.

Some exemplary metallic nanostructure materials include Ag, Au, and Al. However, other metal materials may also be used. In some aspects, a shell/core structure is used, where the shell is a metal material. A liquid crystal (LC) dielectric layer 108 overlies the annealed metallic nanoparticles 106. A transparent top electrode 110 overlies the liquid crystal dielectric 108.

Functional Description

Disclosed herein is a method of thermally treating metallic nanostructures to reduce the chemical degradation of metal oxidation and sulfidation in atmospheric conditions. When a metallic nanostructure film is deposited using a physical vapor deposition (PVD) method, the material deposited usually has a very irregular atomic layer arrangement with high Gibbs free surface energy. In this state, the atomic molecules are generally in an unstable state of equilibrium with crystalline defects existing within the deposited material. Moreover, due to the nature of nanostructures having very large surface-to-volume ratio compared to its bulk material properties, the higher process-initiated free energy effects are intensified, resulting in much larger defects and dislocation of metal atoms. Higher free energy is also associated with higher internal stress of the material, resulting in mechanical fractures of the material. In addition, higher free energy is associated with an increase in chemical reactivity thus promoting sulfidization and corrosion in general. By thermally annealing the nanostructures in controlled atmosphere, the diffusion of atoms within a solid metal occurs and, thus, the material progresses towards its natural equilibrium state. Heating above room temperature increases the rate of diffusion of randomized atoms in the metal by providing the energy needed to break chemical bonds. The movement of atoms has the effect of redistributing the metal atoms to more stable state of equilibrium, also allowing metals to change their shape more readily. Due to the annealing process, surface energy is also reduced in the nanostructures, thereby relieving the internal stresses in a thermodynamically spontaneous process. The high temperatures at which the annealing process occurs serve to accelerate this process.

The reaction that transforms the metal to its stress-free state has many positive pathways, including the elimination of lattice vacancy gradients within the body of the metal that are less susceptible to humidity, temperature, and chemical reaction at the surface level of the nanostructures. The mechanical properties, such as hardness and ductility, are improved by moving the metal atoms to the right lattice site to shape the structures. Since annealing at high temperatures may promote oxidation of the metal's surface, a controlled atmosphere of hydrogen or nitrogen is used during the process.

Figure 2:
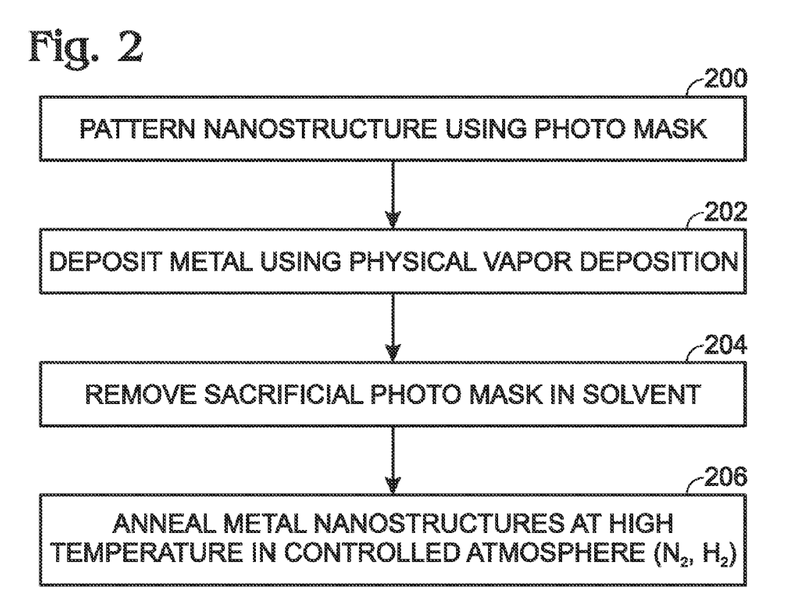
FIG. 2 is a process flowchart for metallic nanostructure stabilization.

FIG. 2 is a process flowchart for metallic nanostructure stabilization. Patterning is performed in Step 200. In one aspect, a photoresist pattern with holes, or e-beam resist holes may be used to insure a uniform nanostructure diameter and a period between nanostructures, permitting silver nanoparticles to be assembled in periodic array configurations on a glass substrate to achieve localized surface plasmon resonance (LSPR) properties for display applications. Silver nanostructures are deposited in Step 202 using a PVD method. Step 204 removes the sacrificial photo mask, and the metallic nanostructures are annealed in Step 206.

In one aspect, a lift-off masking process is used, where a patterned photoresist mask is formed on the substrate, exposing regions of the underlying substrate. A metal layer is deposited on the photoresist mask and exposed substrate regions. After the photoresist mask is removed, the metal (i.e. metallic nanostructures) in the exposed substrate region remains. Otherwise, a photoresist etching process may be used, where a metal layer is initially deposited on the substrate. A patterned photoresist mask is formed over the metal layer, exposing regions of the metal layer. The exposed regions of the metal layer are etched, and after the photoresist mask is removed, the metal (i.e. metallic nanostructures) protected by the photoresist mask remain.

Figure 3A:
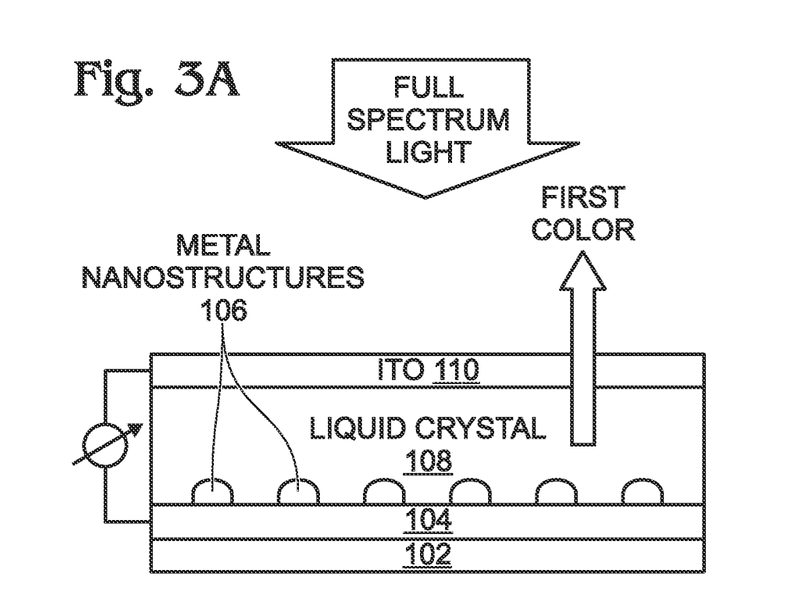
FIGS. 3A and 3B depict arrays of silver nanoparticles with different sizes and particle-to-particle spacing, used for plasmonic reflective displays in two pixel configurations.
Figure 3B:
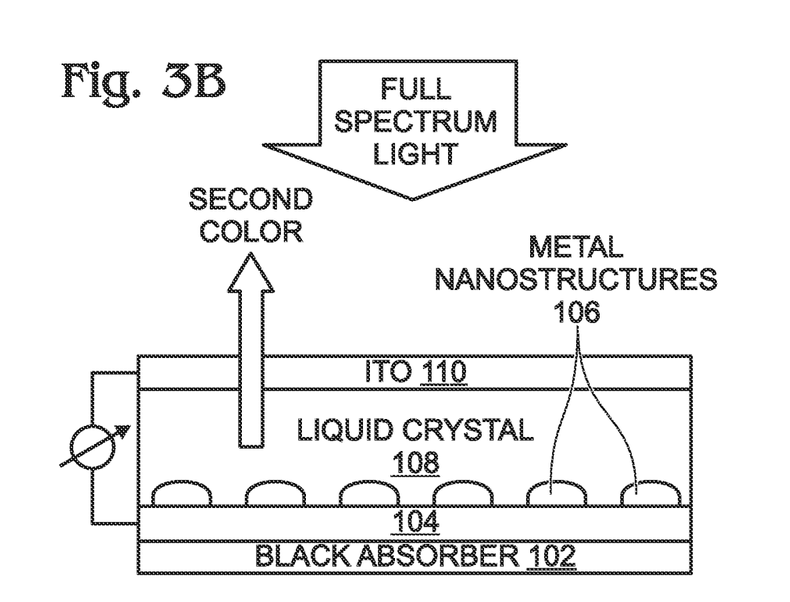

FIGS. 3A and 3B depict arrays of silver nanoparticles with different sizes and particle-to-particle spacing, used for plasmonic reflective displays in two pixel configurations. A pixel may consist of an ITO layer 104 on a glass substrate 102, a high birefringence liquid crystal medium 108 for changing the refractive index properties, and a plasmonic layer that gives reflected color at certain plasmon wavelength peaks. The plasmonic layer consists of an ordered array of metal nanostructures 106, represented by the dome-shaped nanoparticles. Each pixel can change its color continuously in response to changes in square-wave AC voltage applied between the two ITO layers. In particular, the voltage difference between the ITO layers can vary the refractive indices of liquid crystal across a continuous range, which varies the frequency of the plasmon resonances and therefore the optical scattering and absorption spectra. As shown in FIG. 3B, the pixel may be enabled with a black absorber in place of the glass substrate, or as a layer overlying the glass substrate.

Figure 4A:
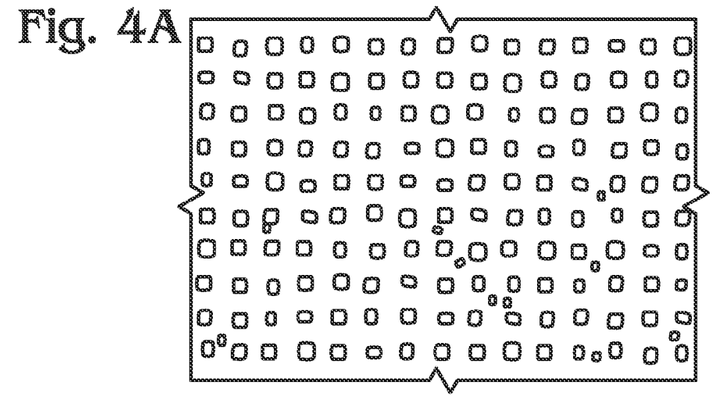
FIGS. 4A and 4B are representations of scanning electron micrograph (SEM) pictures of metallic nanoparticles fabricated using the manufacturing process of FIG. 2.
Figure 4B:
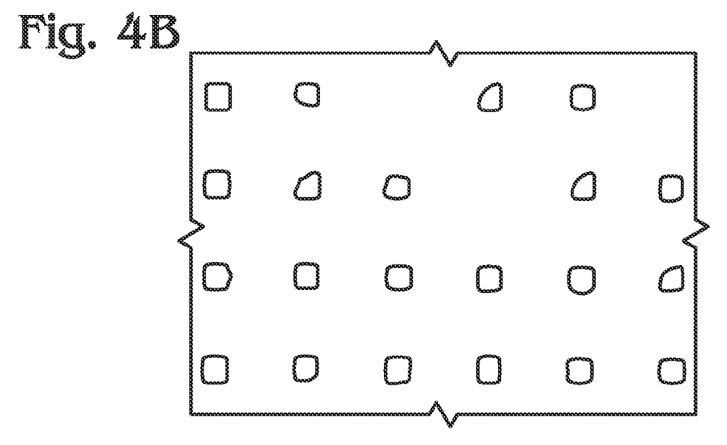

FIGS. 4A and 4B are representations of scanning electron micrograph (SEM) pictures of metallic nanoparticles fabricated using the manufacturing process of FIG. 2. FIG. 4A shows silver nanoparticles with an essentially uniform 45 nanometer (nm) diameter, arranged periodically at a particle-to-particle pitch of 105 nm. The measured LSPR optical property of this particular array of nanoparticles is approximately ~480 nm reflected wavelength and a full-width half maximum (FWHM) of 75 nm in air. FIG. 4B shows silver nanoparticles with an essentially uniform diameter of 130 nm, arranged periodically at a pitch of 400 nm. The LSPR properties of these particular array nanoparticles are approximately 630 nm reflected wavelength. Under incident white light, a pixel made from the first array nanoparticles (FIG. 4A) had a plasmon peak wavelength of 480 nm, constituting the blue color in the reflection mode, and a pixel made from the second array of nanoparticles (FIG. 4B) had a plasmon peak wavelength of 630 nm, which constitutes the color red color. Generally, the nanoparticles of FIGS. 4A and 4B have a square shape, although the corners may be slightly rounded.

Figure 5A:
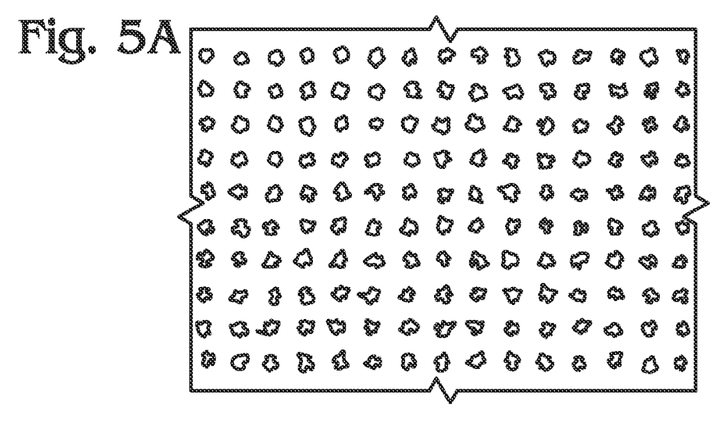
FIGS. 5A and 5B are representations of SEM images of the periodic array silver nanoparticles of FIGS. 4A and 4B, respectively, after silver sulfide has formed on each of the particles.
Figure 5B:
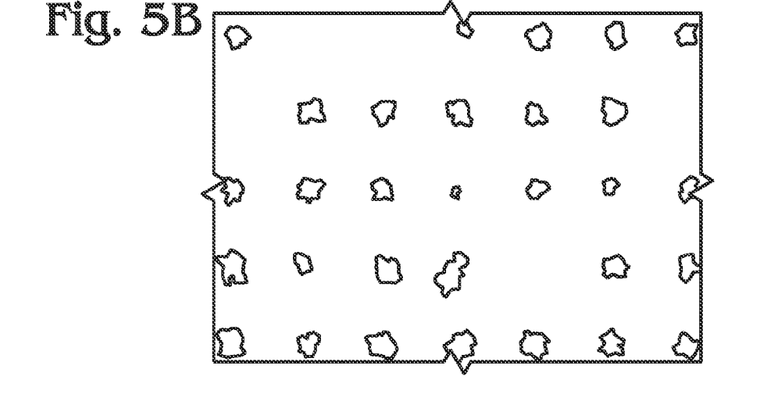

FIGS. 5A and 5B are representations of SEM images of the periodic array silver nanoparticles of FIGS. 4A and 4B, respectively, after silver sulfide has formed on each of the particles. To verify the corrosion of silver nanoparticles in ambient conditions, the metallic nanostructure arrays depicted in FIGS. 4A and 4B were left in laboratory air environment for a 6 to 12 weeks period. The formation of an opaque film on the surfaces of the nanostructures, as well as particle shape deformation, occurs as a result of chemical reaction. The time that the samples were exposed to ambient conditions also affects the amount of reaction that takes place at the surface level of particles. The metallic nanostructures of FIG. 5A, with 12 weeks of exposure in laboratory air, had a greater formation of silver sulfide visible, as compared to 6 weeks in air for the metallic nanostructures of FIG. 5B. The initial particle size of the metallic nanostructures of FIG. 4A (45 nm diameter) increased to a 100 nm diameter due to further formation of silver sulfide on the nanoparticles.

To prevent the chemical corrosion of silver nanostructures fabricated by metal physical vapor deposition and sacrificial layer lift-off process, silver nanoparticles were annealed at 300° C. for 30 minutes in a nitrogen furnace. Thermal treatment in a controlled gas atmosphere such as nitrogen or hydrogen gas is necessary to prevent silver oxidation at the surfaces of nanoparticles during the high temperature treatment.

Figure 6A:
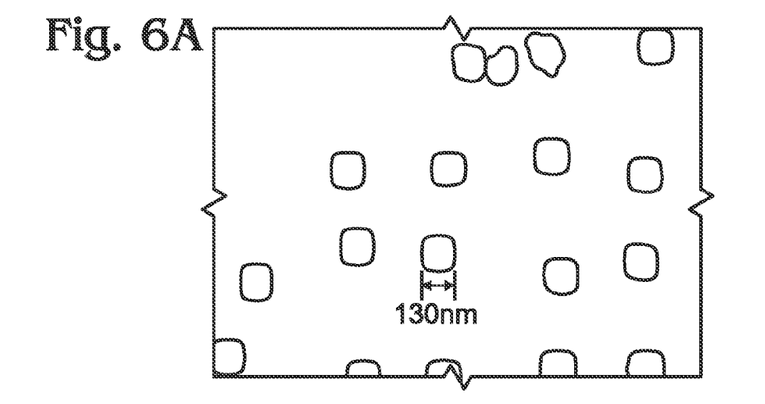
FIGS. 6A and 6B are representations of SEM pictures of semi-periodic arrayed silver nanoparticles on an ITO-layered glass substrate before and after the thermal furnace treatment.
Figure 6B:
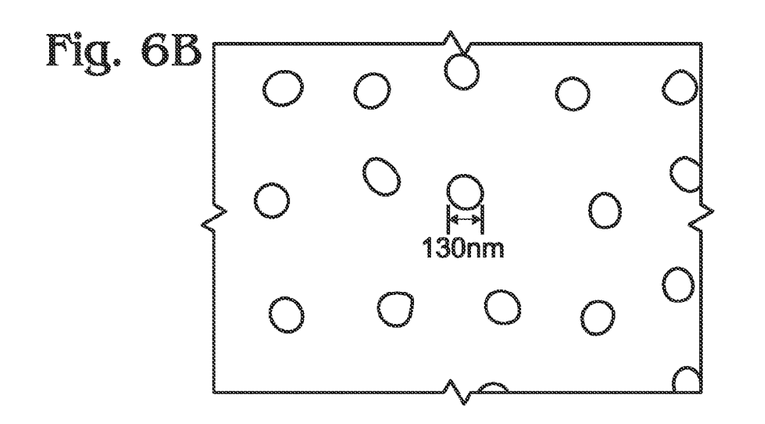

FIGS. 6A and 6B are representations of SEM pictures of semi-periodic arrayed silver nanoparticles on an ITO-layered glass substrate before and after the thermal furnace treatment. The initial rectangular nanostructure shape (FIG. 6A) reveals slightly rounded corners on each four sides. The nanostructure diameter is approximately 130 nm with an irregular atomic layer arrangement due to high free surface energy of as-deposited metal formation. However after the annealing process, the metal atoms are redistributed within the bulk nanoparticles to a more stable state of equilibrium, allowing the metal nanostructures to change their shape more readily. Surface energy is also reduced in the metal nanostructures after the thermal treatment, thereby relieving internal stresses and reducing the chance of mechanical fractures. Although the shape of nanoparticles has changed slightly due to diffusion of the atoms, taking on an ellipsoidal or dome shape with a rounding of the corners, the overall diameter of the particles stays nearly the same according to SEM inspection, and no visible color change was confirmed from plasmonic peak wavelength shift.

Figure 7:
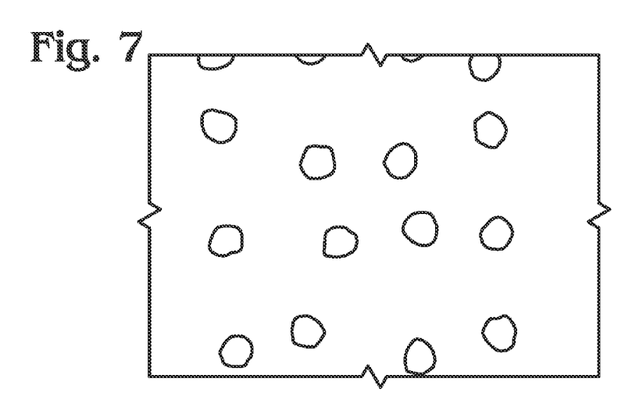
FIG. 7 is a representation of a SEM picture of the sample of FIG. 6B, after the exposure to air.

FIG. 7 is a representation of a SEM picture of the sample of FIG. 6B, after the exposure to air. To verify the effect of thermal treatment, the Ag nanoparticles that were treated at high temperature were left out in ambient air environment for a 2-week duration. The results show no corrosion of silver or particle shape deformation as previously seen in FIGS. 5A and 5B, suggesting that thermal method to treat metal nanostructures in a controlled atmosphere is viable for stabilizing chemical reaction in air environment.

The range of temperature used for annealing depends on the melting point of the metal nanoparticles and the number of atoms per particle. A dynamic coexistence melting point exists where nanoparticles fluctuate between the solid and liquid states. This critical point exists before the actual melting point of the bulk material. This phenomenon can be explained by well-known Lindemann index, which is a measure of thermally driven disorder in atoms or molecules. With the onset of dynamic coexistence between the solid and liquid phases, the value of the Lindemann index increases due to contributions from the liquid phase and finally stabilizes at values about three times the original low-temperature value. So at points where Lindemann index increases sharply, and to where it stabilizes, is the temperature range of bistability, which is the range of interest for annealing. For example, the annealing temperature range for a silver nanostructure of 55 to 864 atoms is in the range of about 400 to 620 Kelvin.

Figure 8:
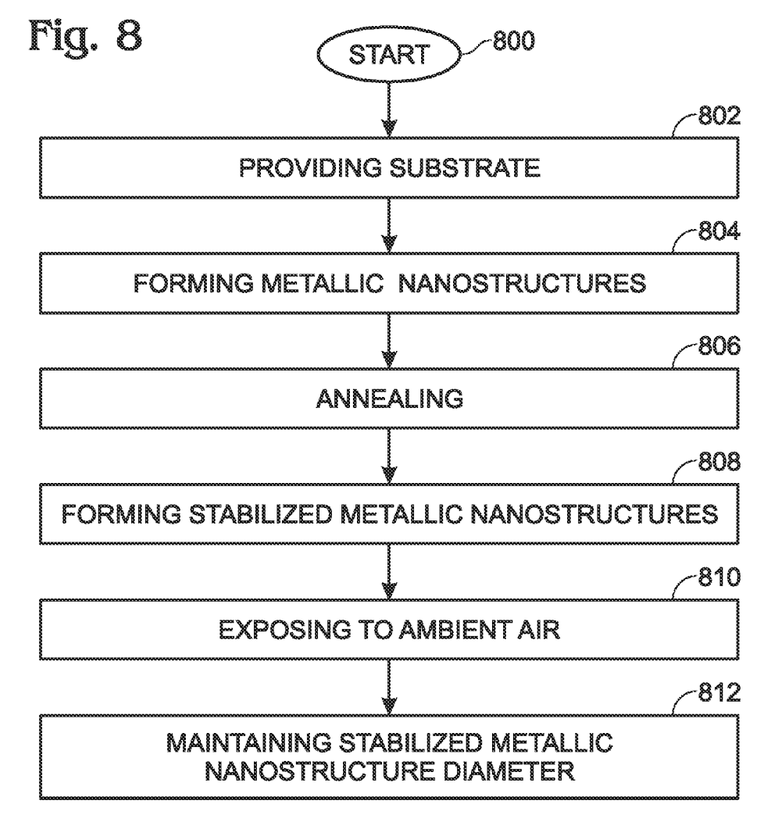
FIG. 8 is a flowchart illustrating a method for improving metallic nanostructure stability.

FIG. 8 is a flowchart illustrating a method for improving metallic nanostructure stability. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 800.

Step 802 provides a substrate. For example, the substrate may be ITO. Step 804 forms metallic nanostructures having a first diameter overlying the substrate. Some examples of metallic nanostructure metal material include Ag, Au, and Al. Otherwise, the metallic nanostructures may be shell/core structure, where the shell is a metal. In one aspect, Step 804 forms metallic nanostructures having a first diameter in the range of 10 to 200 nm. Step 806 anneals the metallic nanostructures in an atmosphere including an inert gas and $H_2$. For example, the inert gas may be argon or $N_2$. Typically, the annealing temperature is less than the melting temperature of metallic nanostructure material when the material is formed as bulk material. In response to the annealing, Step 808 forms stabilized metallic nanostructures. If Step 810 exposes the stabilized metallic nanostructures to an ambient air environment, then in Step 812 the stabilized metallic nanostructure first diameter is maintained after exposure to the ambient air atmosphere.

In one aspect, forming the metallic nanostructures in Step 804 includes forming metallic nanostructures having a rectangular shape with corners. Forming stabilized metallic nanostructures in Step 808 includes forming metallic nanostructures having a dome shape.

In another aspect, forming the metallic nanostructures in Step 804 includes forming metallic nanostructures having a first Gibbs free surface energy. Forming stabilized metallic nanostructures in Step 808 includes forming stabilized metallic nanostructures having a second Gibbs free surface energy, less than the first Gibbs free surface energy.

In one aspect, forming the metallic nanostructures in Step 804 includes using a physical vapor deposition process, which may also incorporate the use a mask with a nanostructure through-hole pattern. Otherwise, Step 804 deposits a metal film layer and used a photoresist lift-off mask or photoresist etching mask to form metallic nanostructures.

Although the examples presented above in FIGS. 4A through 7 depict the deposition of uniform diameter metallic nanostructures, Step 804 may deposit metallic nanostructures having a plurality of (different) diameters. In which case, Step 812 maintains the diameter of each stabilized metallic nanostructure after exposure to the ambient air atmosphere.

Figure 9:
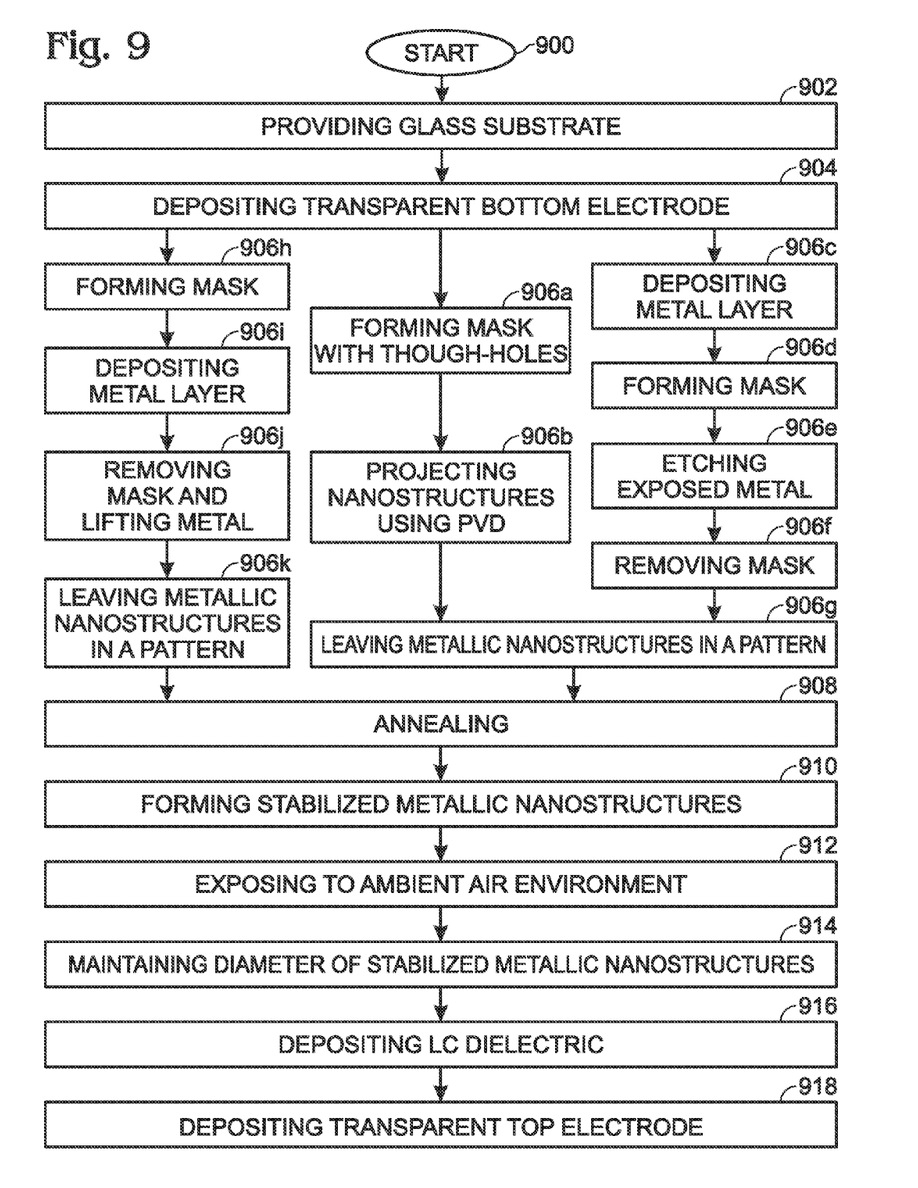
FIG. 9 is a flowchart illustrating a method for fabricating a plasmonic display with improved metallic nanostructure stability.

FIG. 9 is a flowchart illustrating a method for fabricating a plasmonic display with improved metallic nanostructure stability. The method begins at Step 900. Step 902 provides a glass substrate. Step 904 deposits a transparent bottom electrode (e.g., ITO) overlying the glass substrate. Step 906 forms metallic nanostructures having a first diameter overlying the transparent bottom electrode. In one aspect, the metallic nanostructures are formed using a physical vapor deposition (PVD) process. In this aspect, Step 906a forms a photoresist mask with through-holes, Step 906b projects nanostructures towards the bottom electrode through the mask. The metallic nanostructures may, for example, be Ag, Au, or Al, although other metals may also be stabilized using this annealing process. Otherwise, the metallic nanostructures may be a shell/core structure, where the shell is a metal. The metallic nanostructures typically have a first diameter in the range of 10 to 200 nanometers nm.

Step 908 anneals the metallic nanostructure in an atmosphere including an inert gas, such as argon or $N_2$, and $H_2$. Typically, the annealing temperature is less than the melting temperature of metallic nanostructure material when the material is formed as bulk material. In response to the annealing, Step 910 forms stabilized metallic nanostructures. If Step 912 exposes the stabilized metallic nanostructures to an ambient air environment, then Step 914 maintains the stabilized metallic nanostructure first diameter after exposure to the ambient air atmosphere. Step 916 deposits a liquid crystal (LC) dielectric layer overlying the stabilized metallic nanoparticles. Step 918 deposits a transparent top electrode overlying the liquid crystal dielectric.

In one aspect, forming the metallic nanostructures in Step 906 includes forming metallic nanostructures having a rectangular shape with corners. Forming stabilized metallic nanostructures in Step 910 includes forming metallic nanostructures having a dome shape.

In another aspect, forming the metallic nanostructures in Step 906 includes forming metallic nanostructures having a first Gibbs free surface energy. Forming stabilized metallic nanostructures in Step 910 includes forming stabilized metallic nanostructures having a second Gibbs free surface energy, less than the first Gibbs free surface energy.

In one aspect, Step 906 forms metallic nanostructures having a plurality of (different) diameters. Then, in Step 914 each stabilized metallic nanostructure maintains its diameter after exposure to the ambient air environment.

In a different aspect, depositing the transparent bottom electrode in Step 904 includes depositing a transparent bottom electrode having a top surface. Forming the metallic nanostructures in Step 906 includes the following substeps. Step 906c deposits a metal layer. Step 906d forms a patterned photoresist mask overlying the metal layer. Step 906e etches portions of the metal layer exposed by the photoresist mask pattern. Step 906f removes the photoresist mask. Step 906g leaves metallic nanostructures in a pattern overlying the transparent bottom electrode second top surface.

In another aspect, Step 906h forms a patterned photoresist mask overlying the transparent bottom electrode top surface. Step 906i deposits a metal layer overlying the photoresist mask and exposed regions of the bottom electrode. Step 906j removes the photoresist mask and any metal structures overlying the mask. Step 906k leaves metallic nanostructures in a pattern overlying the transparent bottom electrode top surface.

A plasmonic display made from stabilized metallic nanostructure has been provided with an associated process. Examples of particular materials and process steps have been presented to illustrate the invention. However, the invention is not limited to merely these examples. Other variations and embodiments of the invention will occur to those skilled in the art.

We claim:

1. A method for improving metallic nanostructure stability, the method comprising:
   providing a substrate;
   forming metallic nanostructures made from a first metal material, having a first diameter and a first Gibbs free surface energy, overlying the substrate;
   annealing the metallic nanostructures at a temperature less than a melting temperature of bulk first metal material, in an atmosphere including an inert gas and $H_2$;
   in response to the annealing, forming stabilized metallic nanostructures having a second Gibbs free surface energy, less than the first Gibbs free surface energy;
   exposing the stabilized metallic nanostructures to an ambient air environment; and,
   maintaining the stabilized metallic nanostructure first diameter after exposure to the ambient air atmosphere.

2. The method of claim 1 wherein forming the metallic nanostructures includes forming metallic nanostructures having a rectangular shape with corners; and,
   wherein forming stabilized metallic nanostructures includes forming metallic nanostructures having a dome shape.

3. The method of claim 1 wherein forming the metallic nanostructures includes forming nanostructures selected from a group consisting of a metal including Ag, Au, and Al metal, and shell/core where the shell is a metal.

4. The method of claim 1 wherein forming the metallic nanostructures includes forming metallic nanostructures having a first diameter in a range of 10 to 200 nanometers (nm).

5. The method of claim 1 wherein forming the metallic nanostructure includes forming a first plurality of metallic nanostructures having the first diameter and a second plurality of metallic nanostructures having a plurality of diameters different than the first diameter; and,
   wherein maintaining the stabilized metallic nanostructure first diameter after exposure to the ambient air atmosphere includes each stabilized metallic nanostructure in the second plurality of metallic nanostructures maintaining its diameter after exposure to the ambient air environment.

6. The method of claim 1 wherein providing the substrate includes providing an indium tin oxide (ITO) substrate.

7. The method of claim 1 wherein annealing the metallic nanostructure in the inert gas atmosphere includes the inert gas being selected from a group consisting of Ar and $N_2$.

8. The method of claim 1 wherein forming the metallic nanostructures includes using a process selected from a group consisting physical vapor deposition, metal layer deposition using a photoresist lift-off mask process, and metal layer deposition using a photoresist etching mask process.

9. A method for fabricating a plasmonic display with improved metallic nanostructure stability, the method comprising:
   providing a glass substrate;
   depositing a transparent bottom electrode overlying the glass substrate;
   forming metallic nanostructures made from a first metal material, having a first diameter and a first Gibbs free surface energy, overlying the transparent bottom electrode;
   annealing the metallic nanostructure at a temperature less than a melting temperature of bulk first metal material, in an atmosphere including an inert gas and $H_2$;
   in response to the annealing, forming stabilized metallic nanostructures having a second Gibbs free surface energy, less than the first Gibbs free surface energy;
   exposing the stabilized metallic nanostructures to an ambient air environment;
   maintaining the stabilized metallic nanostructure first diameter after exposure to the ambient air atmosphere;
   depositing a liquid crystal dielectric layer overlying the stabilized metallic nanoparticles; and,
   depositing a transparent top electrode overlying the liquid crystal dielectric.

10. The method of claim 9 wherein forming the metallic nanostructures includes forming metallic nanostructures having a rectangular shape with corners; and,
    wherein forming stabilized metallic nanostructures includes forming metallic nanostructures having a dome shape.

11. The method of claim 9 wherein forming the metallic nanostructures includes forming nanostructures selected from a group consisting of metal nanostructures including Ag, Au, and Al, and core/shell nanostructures where the shell is metal.

12. The method of claim 9 wherein forming the metallic nanostructures includes forming metallic nanostructures having a first diameter in a range of 10 to 200 nanometers (nm).

13. The method of claim 9 wherein forming the metallic nanostructure includes forming a first plurality of metallic nanostructures having the first diameter and a second plurality of metallic nanostructures having a plurality of diameters different than the first diameter; and,
 wherein maintaining the stabilized metallic nanostructure first diameter after exposure to the ambient air atmosphere includes each stabilized metallic nanostructure in the second plurality of metallic nanostructures maintaining its diameter after exposure to the ambient air environment.

14. The method of claim 9 wherein providing the substrate includes providing an iridium tin oxide (ITO) substrate.

15. The method of claim 9 wherein annealing the metallic nanostructure in the inert gas atmosphere includes the inert gas being selected from a group consisting of Ar and $N_2$.

16. The method of claim 9 wherein depositing the transparent bottom electrode includes depositing a transparent bottom electrode having a top surface;
 wherein forming the metallic nanostructures includes depositing metallic nanostructures using physical vapor deposition process.

17. The method of claim 9 wherein depositing the transparent bottom electrode includes depositing a transparent bottom electrode having a top surface;
 wherein forming the metallic nanostructures includes:
  depositing a metal layer;
  forming a patterned photoresist mask overlying the metal layer;
  etching portions of the metal layer exposed by the photoresist mask pattern;
  removing the photoresist mask; and,
  leaving metallic nanostructures in a pattern overlying the transparent bottom electrode second top surface.

18. The method of claim 9 wherein depositing the transparent bottom electrode includes depositing a transparent bottom electrode having a top surface;
 wherein forming metallic nanostructures includes:
  forming a patterned photoresist mask overlying the transparent bottom electrode top surface;
  depositing a metal layer overlying the photoresist mask and exposed regions of the bottom electrode;
  removing the photoresist mask; and,
  leaving metallic nanostructures in a pattern overlying the transparent bottom electrode top surface.

* * * * *